United States Patent
Bes et al.

(10) Patent No.: US 10,501,835 B2
(45) Date of Patent: Dec. 10, 2019

(54) THIN SHEETS MADE OF AN ALUMINIUM-COPPER-LITHIUM ALLOY FOR PRODUCING AIRPLANE FUSELAGES

(71) Applicant: CONSTELLIUM ISSOIRE, Issoire (FR)

(72) Inventors: Bernard Bes, Seyssins (FR); Juliette Chevy, Moirans (FR); Frank Eberl, Issoire (FR)

(73) Assignee: CONSTELLIUM ISSOIRE, Issoire (FR)

(*) Notice: Subject to any disclaimer, the term of this patent is extended or adjusted under 35 U.S.C. 154(b) by 929 days.

(21) Appl. No.: 14/781,096

(22) PCT Filed: Apr. 1, 2014

(86) PCT No.: PCT/FR2014/000070
§ 371 (c)(1),
(2) Date: Sep. 29, 2015

(87) PCT Pub. No.: WO2014/162069
PCT Pub. Date: Oct. 9, 2014

(65) Prior Publication Data
US 2016/0053357 A1 Feb. 25, 2016

(30) Foreign Application Priority Data
Apr. 3, 2013 (FR) ...................... 13 00764

(51) Int. Cl.
C22F 1/057 (2006.01)
C22C 21/16 (2006.01)
C22C 21/14 (2006.01)
C22F 1/00 (2006.01)
B64C 1/00 (2006.01)

(52) U.S. Cl.
CPC .............. *C22F 1/057* (2013.01); *C22C 21/14* (2013.01); *C22C 21/16* (2013.01); *C22F 1/002* (2013.01); *B64C 2001/0081* (2013.01)

(58) Field of Classification Search
CPC ....................................................... C22F 1/057
See application file for complete search history.

(56) References Cited

U.S. PATENT DOCUMENTS

| | | |
|---|---|---|
| 4,795,502 A | 1/1989 | Cho |
| 5,198,045 A | 3/1993 | Cho et al. |
| 7,744,704 B2 | 6/2010 | Bes et al. |
| 2008/0289728 A1* | 11/2008 | Bes .................. C22C 21/16 148/552 |
| 2010/0314007 A1 | 12/2010 | Danielou et al. |
| 2011/0209801 A2 | 9/2011 | Warner et al. |
| 2013/0092294 A1 | 4/2013 | Eberl et al. |

FOREIGN PATENT DOCUMENTS

| | | |
|---|---|---|
| CN | 101967588 A | 2/2011 |
| WO | 2006131627 A1 | 12/2006 |
| WO | 2009036953 A1 | 3/2009 |
| WO | 2012044450 A2 | 4/2012 |

OTHER PUBLICATIONS

Barton, Matthew; Grounds for Opposition European Patent No. EP2981632B1 European Patent Application No. 14719035.9 Patent Holder: Constellium Issoire; dated Apr. 30, 2018.
International Search Report from corresponding PCT/FR2014/000070, dated Jun. 12, 2014.
Chen et al., "Near-Threshold Fatigue Crack Growth Behavior of 2195 Aluminum-Lithium-Alloy—Prediction of Crack Propagation Direction and Influence of Stress Ratio", Metallurgical and Materials Transactions A, vol. 31A, Jun. 2000, pp. 1531-1541.

* cited by examiner

*Primary Examiner* — Christopher S Kessler
(74) *Attorney, Agent, or Firm* — McBee Moore Woodward & Vanik IP, LLC

(57) ABSTRACT

The invention relates to a method for manufacturing a thin sheet having a thickness of 0.5 to 3.3 mm and an essentially non-recrystallized structure made of aluminum-based alloy.

20 Claims, 5 Drawing Sheets

THIN SHEETS MADE OF AN ALUMINIUM-COPPER-LITHIUM ALLOY FOR PRODUCING AIRPLANE FUSELAGES

CROSS REFERENCE TO RELATED APPLICATIONS

This application is a § 371 National Stage Application of PCT/FR2014/000070, filed 1 Apr. 2014, which claims priority to FR 13/00764, filed 3 Apr. 2013.

BACKGROUND

Field of the Invention

The invention relates to aluminum-copper-lithium alloy rolled products, and more particularly to such products, their manufacturing processes and use, designed notably for aeronautical and aerospace engineering.

Description of Related Art

Rolled products made of aluminum alloy are developed in order to produce fuselage components intended notably for the aeronautical and aerospace industry.

Aluminum-copper-lithium alloys are particularly beneficial for the production of this type of product.

U.S. Pat. No. 5,032,359 describes a vast family of aluminum-copper-lithium alloys in which the addition of magnesium and silver, in particular between 0.3 and 0.5 percent by weight, makes it possible to increase the mechanical strength.

U.S. Pat. No. 5,455,003 describes a process for manufacturing Al—Cu—Li alloys that have improved mechanical strength and fracture toughness at cryogenic temperature, in particular owing to appropriate strain hardening and aging. This patent particularly recommends the composition, expressed as a percentage by weight, Cu=3.0-4.5, Li=0.7-1.1, Ag=0-0.6, Mg=0.3-0.6 and Zn=0-0.75.

U.S. Pat. No. 7,438,772 describes alloys including, expressed as a percentage by weight, Cu: 3-5, Mg: 0.5-2, Li: 0.01-0.9 and discourages the use of higher lithium contents because of a reduction in the balance between fracture toughness and mechanical strength.

U.S. Pat. No. 7,229,509 describes an alloy including (% by weight): (2.5-5.5) Cu, (0.1-2.5) Li, (0.2-1.0) Mg, (0.2-0.8) Ag, (0.2-0.8) Mn, 0.4 max Zr or other grain-refining agents such as Cr, Ti, Hf, Sc, and V.

US patent application 2009/142222 A1 describes alloys including (% by weight), 3.4% to 4.2% Cu, 0.9% to 1.4% Li, 0.3% to 0.7% Ag, 0.1% to 0.6% Mg, 0.2% to 0.8% Zn, 0.1% to 0.6% Mn and 0.01% to 0.6% of at least one element for controlling the granular structure. This application also describes a process for manufacturing extruded products. US patent application 2011/0247730 describes alloys including (% by weight), 2.75 to 5.0% Cu, 0.1 to 1.1% Li, 0.3 to 2.0% Ag, 0.2 to 0.8% Mg, 0.50 to 1.5% Zn, and up to 1.0% Mn, with a Cu/Mg ratio between 6.1 and 17, this alloy being insensitive to work hardening.

Patent application CN101967588 describes alloys of composition (% by weight) Cu 2.8-4.0; Li 0.8-1.9; Mn 0.2-0.6; Zn 0.20-0.80, Zr 0.04-0.20, Mg 0.20-0.80, Ag 0.1-0.7, Si<0.10. Fe≤0.10, Ti≤0.12.

The required characteristics for aluminum plates intended for fuselage applications are notably described, for example, in patent EP 1 891 247. It is notably desirable that the plate has a high yield stress (to resist buckling) as well as high fracture toughness in plane strain, notably characterized by a high value of apparent stress intensity factor at break (Kapp) and a long R-curve.

Patent EP 1 966 402 discloses an alloy comprising 2.1 to 2.8% by weight of Cu, 1.1 to 1.7% by weight of Li, 0.1 to 0.8% by weight of Ag, 0.2 to 0.6% by weight of Mg, 0.2 to 0.6% by weight of Mn, a quantity of Fe and Si less than or equal to 0.1% by weight each, and inevitable impurities with a content less than or equal to 0.05% by weight each and 0.15% by weight in total, the alloy being substantially free of zirconium, particularly suitable for obtaining recrystallized sheets.

For certain fuselage applications, it is particularly important that the fracture toughness is high in the T-L direction. Indeed, a large part of the fuselage is designed to withstand the internal pressure of the airplane. As the longitudinal direction of the sheets is generally positioned in the direction of the length of the airplane, they are subjected to stress in the transverse direction by the pressure. The cracks are thus subjected to stress in the T-L direction.

Obtaining high fracture toughness, notably in the T-L direction is particularly delicate on the sheets such as those with thickness between 0.5 and 3.3 mm.

It is known from patent EP 1 891 247 that for plates with thickness between 4 and 12 mm, it may be advantageous that the microstructure be completely unrecrystallized. However, the effect of the granular structure on the properties may be different at different thicknesses. Also, obtaining a substantially unrecrystallized structure for sheets with thickness between 0.5 mm and 3.3 mm is difficult because the energy stored during cold working most often leads to recrystallization during the solution heat treatment. Thus, the sheets with thickness between 0.5 mm and 3.3 mm described in EP 1 891 247 have a 100% recrystallized structure (also see patent FR 2 889 542, Table 6). US patent application 2012/0055590 mentions obtaining an unrecrystallized structure for sheets of 2 mm thick. However, the method proposed in this application to obtain an unrecrystallized structure requires significant cold working, at least 25%, after solution heat treatment and quenching of the sheet. This type of cold working can be delicate to achieve because the sheets reach a high degree of hardness within a few hours after solution heat treatment and quenching. Moreover, significant cold working after solution heat treatment and quenching affects the granular structure, and the products obtained by the method described in US application 2012/0055590 have numerous shearing bands passing through several grains, as shown in FIGS. 11b to 11e, which can notably have negative effects on formability and fracture toughness in certain loading directions or on the location of the corrosion.

Patent EP 1 170 394 also mentions obtaining unrecrystallized structures, but for sheets of thicknesses greater than 3.5 mm.

There exists a need for sheets, of thickness 0.5 to 3.3 mm, made of aluminum-copper-lithium alloy presenting improved properties as compared with those of known products, particularly in terms of fracture toughness in the T-L direction, static mechanical strength and corrosion resistance properties, while having low density. Furthermore, there exists a need for a simple and economical process for obtaining these sheets.

SUMMARY

An object of the invention is a method for manufacturing a sheet of thickness 0.5 to 3.3 mm with a essentially unrecrystallized structure made of an aluminum-based alloy wherein successively a) a molten metal bath is prepared comprising
   2.6 to 3.4% by weight of Cu,
   0.5 to 1.1% by weight of Li,
   0.1 to 0.4% by weight of Ag,
   0.2 to 0.8% by weight of Mg,
   0.11 to 0.20% by weight of Zr,
   0.01 to 0.15% by weight of Ti,
   optionally at least one element chosen among Mn, V, Cr, Sc, and Hf, the quantity of element, if chosen, being from 0.01 to 0.8% by weight for Mn, 0.05 to 0.2% by weight for V, 0.05 to 0.3% by weight for Cr, 0.02 to 0.3% by weight for Sc, 0.05 to 0.5% by weight for Hf,
   a quantity of Zn less than 0.6% by weight, a quantity of Fe and Si less than or equal to 0.1% by weight each, and inevitable impurities with a content less than or equal to 0.05% by weight each and 0.15% by weight in total,
b) a slab is cast from said molten metal bath;
c) said slab is homogenized at a temperature between 450° C. and 515° C.;
d) said slab is hot rolled into a plate of thickness between 4 and 12 mm;
e) said plate is cold rolled into a sheet of final thickness between 0.5 and 3.3 mm, the reduction in thickness by cold rolling being between 1 and 3.5 mm;
f) heat treatment is performed during which the sheet reaches a temperature between 300° C. and 450° C. for at least thirty minutes;
g) said sheet undergoes solution heat treatment at a temperature between 450° C. and 515° C. and quenched;
h) said sheet undergoes controlled stretching with a permanent deformation of 0.5 to 5%, cold working after solution heat treatment being less than 15%;
i) aging is performed at a temperature between 130° C. and 170° C. and preferably between 150° C. and 160° C. for 5 to 100 hours and preferably for 10 to 40 hours.

Another object of the invention is a sheet of essentially unrecrystallized granular structure obtained by the method according to the invention, the yield stress $R_{p0.2}$ in the T-L direction is at least 395 MPa, whose fracture toughness in plane strain $K_{app}$, measured on test pieces of type CCT760 (2ao=253 mm), of at least 150 MPa√m.

Yet another object of the invention is the use of a sheet according to the invention in an aircraft fuselage panel.

DETAILED DESCRIPTION OF A PREFERRED EMBODIMENT

Figure 1:
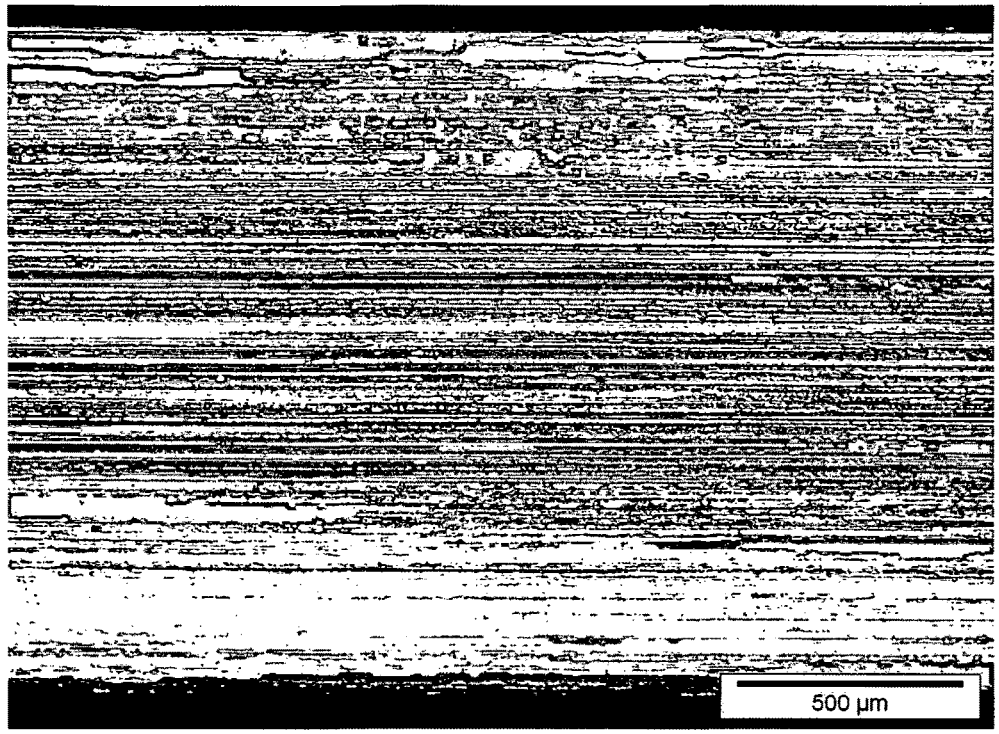
FIG. 1: Metallographic section of sheet A.
Figure 2:
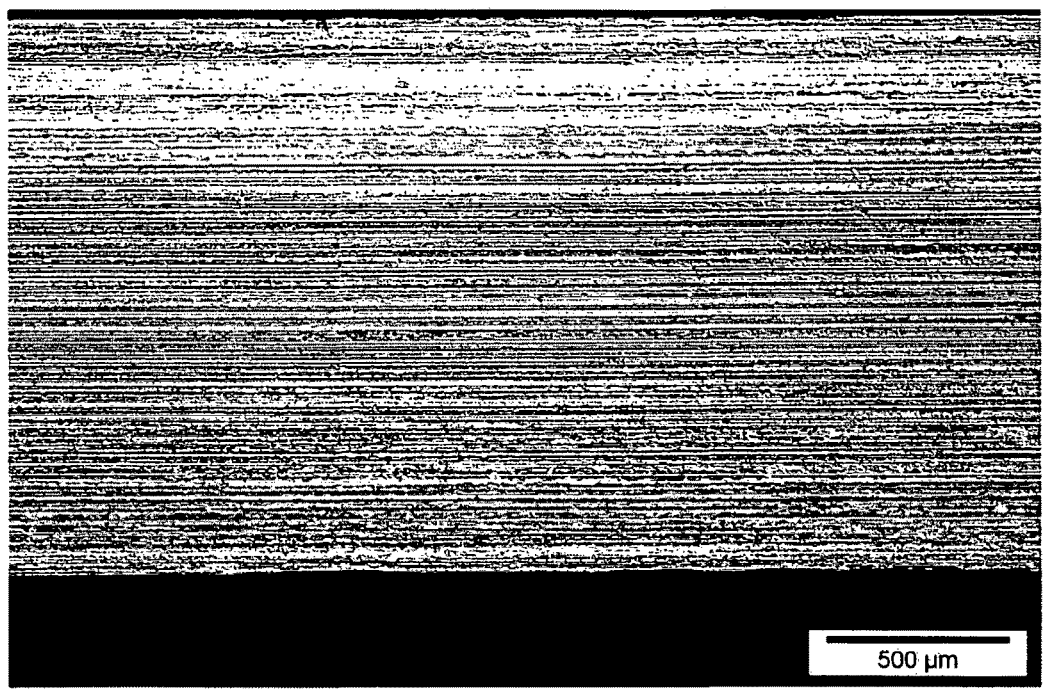
FIG. 2: Metallographic section of sheet B.
Figure 3:
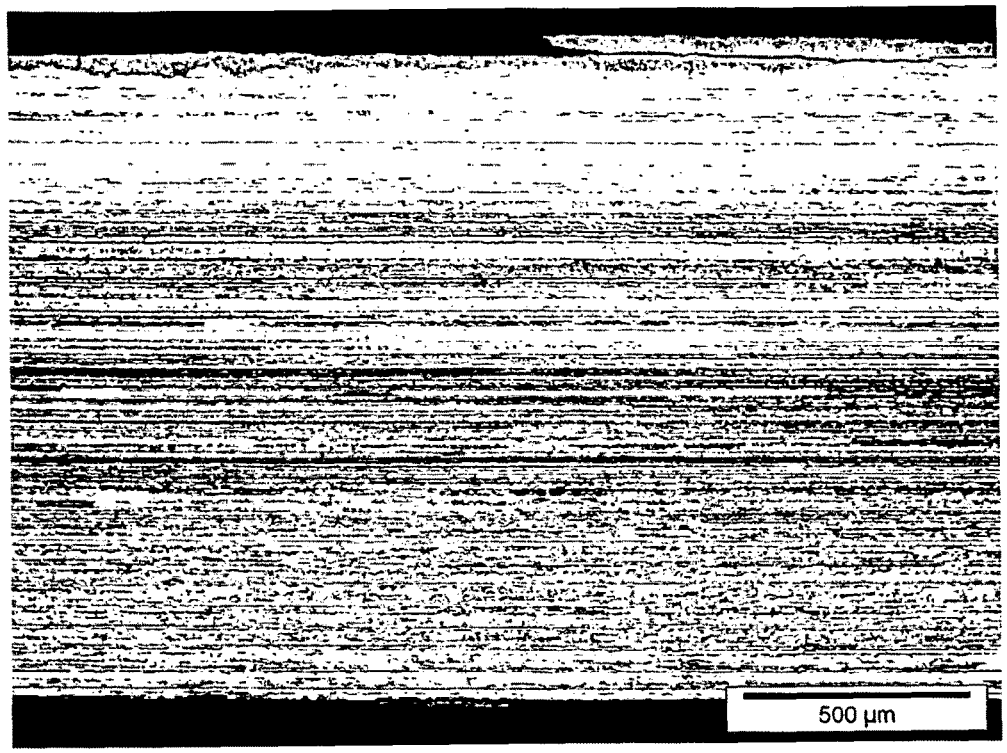
FIG. 3: Metallographic section of sheet C.
Figure 4:
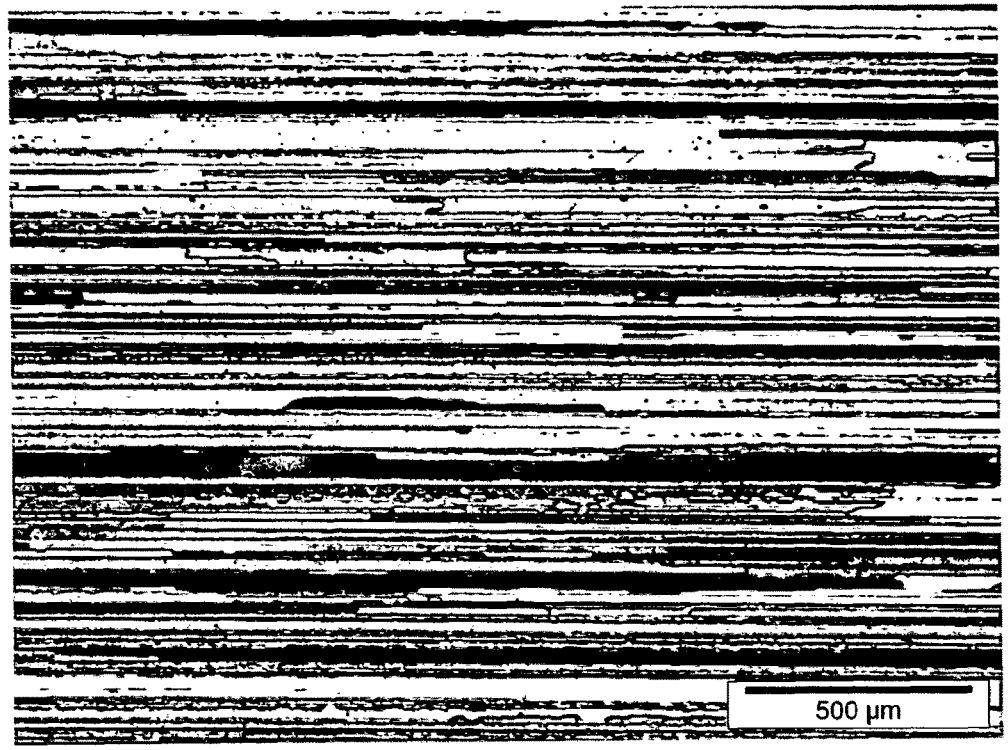
FIG. 4: Metallographic section of sheet D.
Figure 5:
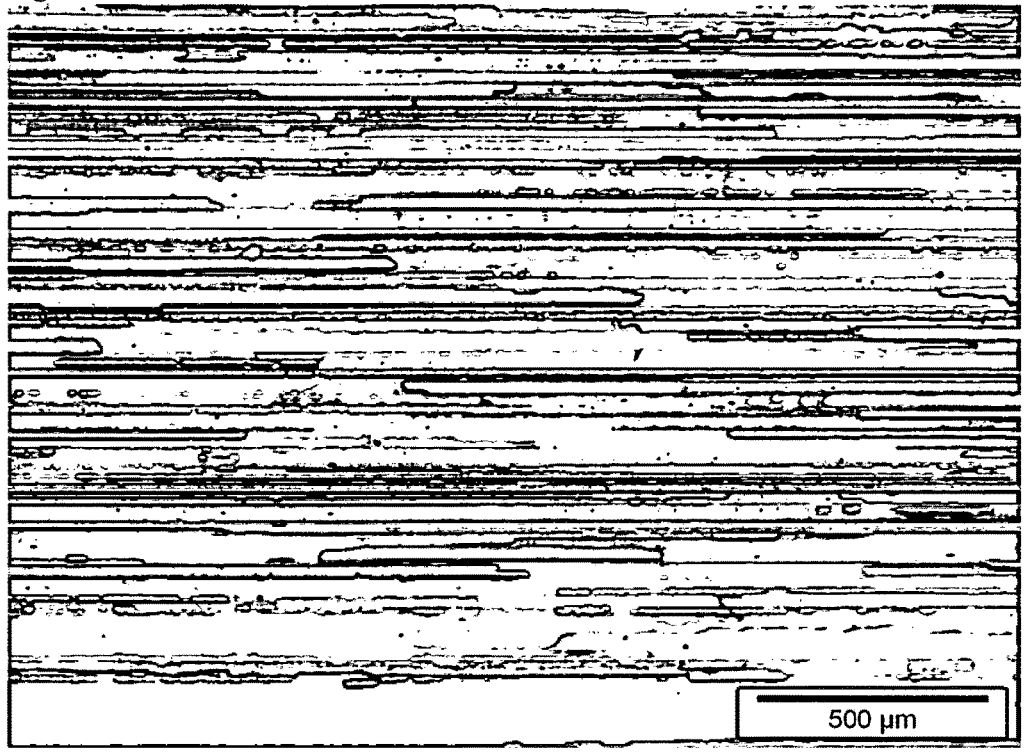
FIG. 5: Metallographic section of sheet E.
Figure 6:
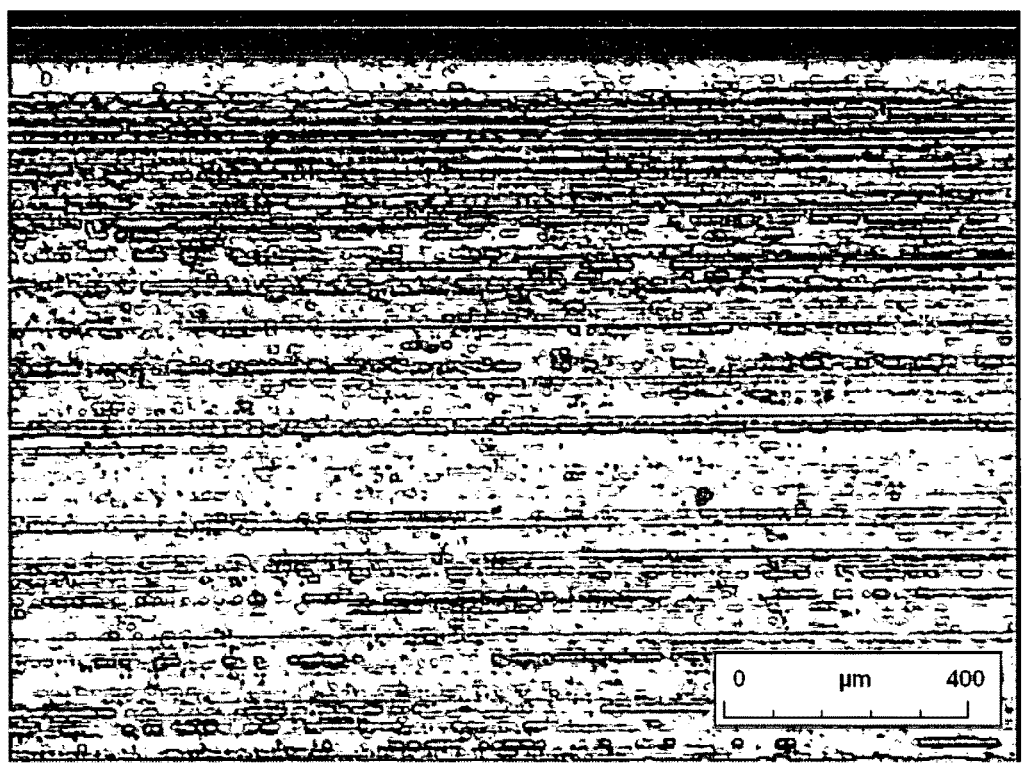
FIG. 6: Metallographic section of sheet F.
Figure 7:
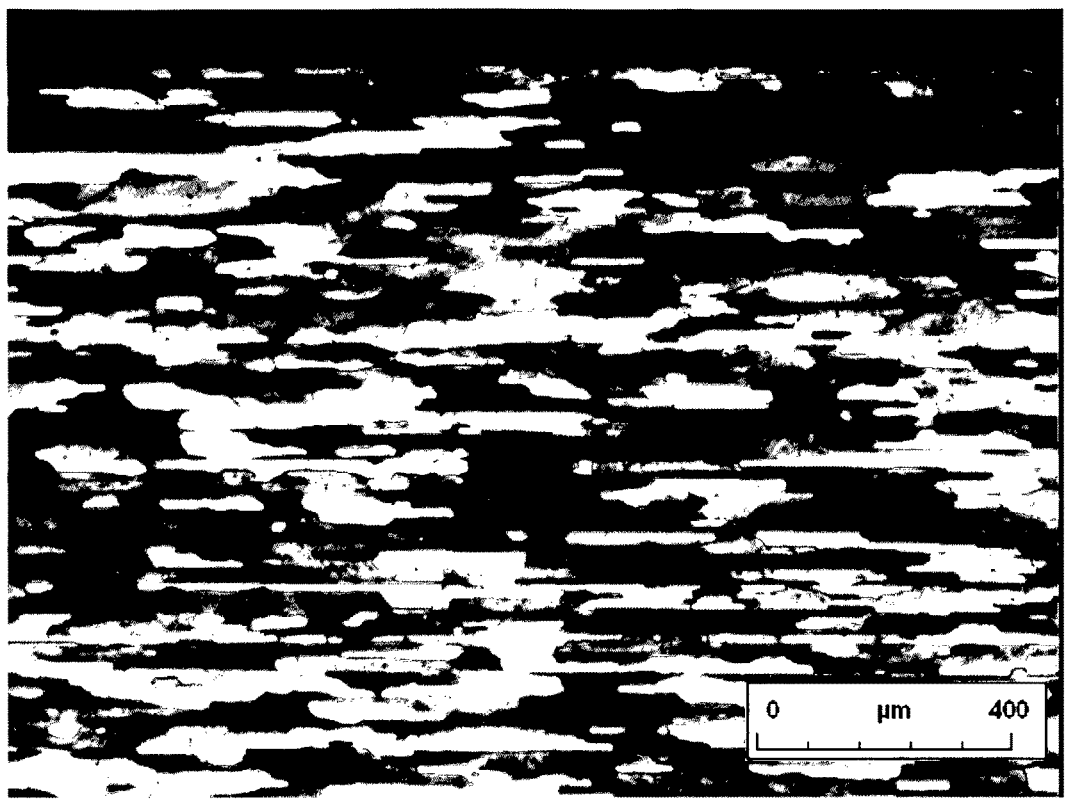
FIG. 7: Metallographic section of sheet G.

Unless otherwise specified, all the indications concerning the chemical composition of the alloys are expressed as a percentage by weight based on the total weight of the alloy. The expression 1.4 Cu means that the copper content, expressed as a percentage by weight is multiplied by 1.4.

The designation of alloys is compliant with the rules of The Aluminum Association, known to experts in the field. The density depends on the composition and is determined by calculation rather than by a method of weight measurement. The values are calculated in compliance with the rules of The Aluminum Association, which is described on pages 2-12 and 2-13 of "Aluminum Standards and Data". Unless otherwise specified, the definitions of tempers listed in European Standard EN 515 apply.

The static tensile mechanical properties, in other words the ultimate tensile strength $R_m$, the conventional yield strength at 0.2% elongation $R_{p0.2}$, and the elongation at rupture A%, are determined by means of a tensile test as per standard NF EN ISO 6892-1, the sampling and direction of the test being defined by the standard EN 485-1.

Within the framework of the invention, the mechanical properties are measured in full thickness.

A curve giving the effective stress intensity factor as a function of the effective crack extension, known as the R-curve, is determined according to standard ASTM E 561. The critical stress intensity factor $K_C$, in other words the intensity factor which makes the crack unstable, is calculated from the R-curve. The stress intensity factor $K_{CO}$ is also calculated by allotting the initial crack length at the beginning of the monotonic load, at critical load. These two values are calculated for a test piece of the required shape. $K_{app}$ represents the $K_{CO}$ factor corresponding to the test piece that was used to carry out the R-curve test. $K_{eff}$ represents the $K_C$ factor corresponding to the test piece used to carry out the R-curve test. $\Delta a_{eff}(max)$ represents the crack extension of the last point of the R-curve, valid according to standard ASTM E561. The last point is obtained either at the time of sudden rupture of the test piece, or possibly when the stress on the uncracked ligament exceeds the yield stress of the material. Unless otherwise specified, the crack size at the end of the stage of pre-cracking by fatigue is W/3 for test pieces of the M (T) type, wherein W is the width of the test piece as defined in standard ASTM E561.

Unless otherwise specified, the definitions of standard EN 12258 apply.

Within the framework of the present invention, an essentially unrecrystallized granular structure refers to a granular structure such that the recrystallization rate at ½ thickness is less than 30% and preferably less than 10% and an essentially recrystallized granular structure refers to a granular structure such that the recrystallization rate at ½ thickness is greater than 70% and preferably greater than 90%. The recrystallization rate is defined as the area fraction on a metallographic section occupied by recrystallized grains.

The present inventors have obtained essentially unrecrystallized sheets made of alloy according to the invention of thickness 0.5 to 3.3 mm using the method according to the invention which includes the combination of
   homogenization at a temperature between 450° C. and 515° C.,
   deformation by cold rolling with a thickness reduction between 1 and 3.5 mm,
   a heat treatment after cold rolling and before solution heat treatment during which the sheet reaches a temperature between 300° C. and 450° C. for at least thirty minutes.

The sheets thus obtained have particularly advantageous properties, notably regarding fracture toughness in the T-L direction.

Advantageously, mid-thickness texture of the essentially unrecrystallized sheets according to the invention is such that the P component, the Q component and the sum of the three components Cube, Goss and GC26.5, expressed in volume fraction, are less than those of a random crystallographic texture.

In the method according to the invention, a molten metal bath is prepared having the following composition.

The copper content of the products according to the invention lies between 2.6 and 3.4% by weight. In an advantageous embodiment of the invention, the copper content lies between 2.8 and 3.1% by weight. In an advantageous embodiment of the invention, the copper content is at most 3.0% by weight and preferably at most 2.96% by weight. In an advantageous embodiment of the invention, the copper content is at most 2.9% by weight. When the copper content is too high, a very high fracture toughness value in the T-L direction may not be reached. When the copper content is too low, the minimum static mechanical properties are not reached.

The lithium content of the products according to the invention lies between 0.5 and 1.1% by weight. Advantageously, the lithium content lies between 0.55 and 0.75% by weight. Preferably, the lithium content lies between 0.60% and 0.73% by weight. The addition of lithium may contribute to the increase in the mechanical strength and the fracture toughness, a content too high or too low does not allow a very high value of fracture toughness to be obtained in the T-L direction and/or a sufficient yield stress.

The magnesium content of the products according to the invention lies between 0.2 and 0.8% by weight, and preferably between 0.40 and 0.70% by weight. In an advantageous embodiment of the invention, the magnesium content lies between 0.50 and 0.65% by weight.

The zirconium content lies between 0.11 and 0.20% by weight and preferably between 0.12 and 0.18% by weight. The zirconium content lies preferably between 0.14 and 0.17% by weight. The addition of zirconium in these proportions notably contributes to obtaining a essentially unrecrystallized structure.

The silver content lies between 0.1 and 0.4% by weight. In an advantageous embodiment of the invention, the silver content lies between 0.2 and 0.3% by weight. In an embodiment of the invention, the silver content lies between 0.15 and 0.28% by weight.

The titanium content lies between 0.01 and 0.15% by weight. The addition of titanium helps to control the granular structure, particularly during casting.

The alloy can optionally contain at least one element selected from Mn, V, Cr, Sc, and Hf, the quantity of the element, if chosen, being from 0.01 to 0.8% by weight for Mn, 0.05 to 0.2% by weight for V, 0.05 to 0.3% by weight for Cr, 0.02 to 0.3% by weight for Sc, 0.05 to 0.5% by weight for Hf. These elements can contribute to controlling the granular structure. In an embodiment of the invention, Mn, V, Cr or Sc is not added and their content is less than or equal to 0.05% by weight.

Preferably, the iron and silicon contents are each at the most 0.1% by weight. In an advantageous embodiment of the invention, the iron and silicon contents are at most 0.08% by weight and preferably at most 0.04% by weight. A controlled and limited iron and silicon content helps to improve the balance between mechanical strength and damage tolerance.

The zinc content is less than 0.6% by weight. Preferably, the zinc content is less than 0.2% by weight and preferably less than 0.1% by weight. The zinc content is advantageously less than 0.04% by weight.

The inevitable impurities are kept at a content less than or equal to 0.05% by weight each and 0.15% by weight in total.

The sheet manufacturing method according to the invention then comprises casting, hot rolling and cold rolling, intermediate heat treatment, solution heat treatment, controlled stretching, quenching and aging steps.

The prepared molten metal bath is then cast in the form of a rolling slab.

The rolling slab is then homogenized at a temperature between 450° C. and 515° C. The homogenization time is preferably between 5 and 60 hours. The homogenization temperature is advantageously at least 480° C. The present inventors noted that, in some cases, a homogenization temperature above 515° C. does not allow the desired essentially unrecrystallized granular structure to be attained.

After homogenization, the rolling slab is generally cooled at room temperature before being preheated ready for hot working. The aim of preheating is to reach a temperature preferably between 400° C. and 500° C. enabling the deformation by hot rolling to take place.

Hot rolling is carried out to obtain a thickness of 4 to 12 mm. The temperature during hot rolling is preferably at least 300° C.

After hot rolling, the plate obtained is cold rolled into a sheet having a final thickness between 0.5 and 3.3 mm. Preferentially, the final thickness is at most 3.0 mm and preferably at most 2.8 mm. Advantageously, the final thickness is at least 0.8 mm and most preferably at least 1.2 mm. Controlling of the reduction in thickness by cold rolling is important in order to obtain the desired essentially unrecrystallized granular structure. The present inventors noted that a reduction in thickness through excessive cold rolling does not allow the desired essentially unrecrystallized granular structure to be obtained. The present inventors noted that a reduction in thickness through excessive cold rolling does not allow the desired essentially unrecrystallized granular structure to be obtained. The reduction in thickness by cold rolling is, according to the invention, between 1 and 3.5 mm. In an advantageous embodiment, the reduction in thickness by cold rolling is at most 3.0 mm. Surprisingly, controlling the reduction in thickness by cold rolling, measured in mm, is more important than controlling of the percentage of reduction during cold rolling.

After cold rolling, a heat treatment is performed during which the sheet reaches a temperature between 300° C. and 450° C. for at least thirty minutes, preferably at least one hour and more preferably for at least two hours. This treatment also contributes to obtaining the desired essentially unrecrystallized granular structure.

This treatment may be a separate heat treatment or may be performed as the temperature rises during the solution heat treatment, in the form of a temperature plateau and/or a suitable rise rate. However, this treatment is not obtained during the temperature rise of the solution heat treatment known from the prior art because the heating rate of sheets less than or equal to 3.3 mm thick is at least 30° C./min, and typically in the order of at least 50° C./min between 300° C. and 450° C. and the time spent at a temperature between 300° C. and 450° C. is thus therefore less than 5 minutes, and typically in the order of 3 minutes.

The sheet thus obtained is solution heat treated between 450° C. and 515° C. The solution heat treatment time is advantageously between 5 min. to 8 hours. Following solution heat treatment, the sheet is then quenched.

It is known to those skilled in the art that the precise solution heat treatment conditions must be chosen based on the thickness and the composition so as to place the hardening elements in a solid solution.

The sheet then undergoes cold working by controlled stretching with a permanent deformation of 0.5 to 5% and preferably of 1 to 3%. Known steps such as rolling, flattening, straightening or shaping may optionally be performed after heat treatment and quenching, and before or after controlled stretching. However, the total cold working after solution heat treatment and quenching must remain below 15% and preferably less than 10%. Significant cold working after solution heat treatment and quenching result in the appearance of numerous shearing bands through several grains; these shearing bands not being desirable. Preferably, cold rolling is not performed after solution heat treatment.

Aging is performed at a temperature between 130° C. and 170° C. and preferably between 150° C. and 160° C. for 5 to 100 hours and preferably from 10 to 40 hours. Preferably, the final temper is T8.

In an embodiment of the invention, a short thermal treatment is carried out after controlled stretching and before aging so as to improve the formability of the sheets. The sheets can thus be formed by a process such as draw-forming before being aged.

The sheets of essentially unrecrystallized structure obtained by the method according to the invention have a particularly advantageous fracture toughness in the T-L direction. In particular, sheets obtained by the process according to the invention exhibit a yield stress Rp0.2 in the T-L direction of at least 395 MPa, and a fracture toughness in plane strain Kapp, measured on test pieces of type CCT760 (2ao=253 mm) in the T-L direction, of at least 150 MPa√m.

For the sheets according to the invention, the lithium content is between 0.55 and 0.75% by weight, elongation in the T-L direction is at least 14%. In addition, for the sheets with a lithium content between 0.55 and 0.75%, the yield stress $R_{p0.2}$ in the T-L direction is advantageously at least 405 MPa, and the fracture toughness in plane strain $K_{app}$, measured on test pieces of type CCT760 (2ao=253 mm) in the T-L direction is advantageously at least 160 MPa√m, notably for a magnesium content between 0.40 and 0.65% by weight. Furthermore, for sheets with lithium content between 0.55 and 0.75%, the elongation in the T-L direction is preferably at least 15%, notably for a copper content of between 2.8 and 3.0% by weight.

The most favorable performance characteristics of the sheets according to the invention, namely a yield stress $R_{p0.2}$ in the T-L direction of at least 410 MPa, a fracture toughness in plane strain $K_{app}$, measured on test pieces of type CCT760 (2ao=253 mm), in the T-L direction of at least 163 MPa√m and preferably of at least 165 MPa√m and elongation in the T-L direction of at least 16%, are notably obtained when the lithium content lies between 0.55 and 0.75% by weight, the copper content is between 2.8 and 3.0% by weight and the magnesium content lies between 0.40 and 0.65% by weight. Preferably, the magnesium content lies between 0.50 and 0.65% by weight in this embodiment.

Advantageously, the sheets according to the invention have an elongation at 45° relative to the rolling direction of at least 18% and preferably at least 20 or 21%. The present inventors noted that the sheets according to the invention do not exhibit shearing bands passing through several grains.

The intercrystalline corrosion resistance of the sheets according to the invention is high. In a preferred embodiment of the invention, the sheet of the invention can be used without cladding.

The use of sheets according to the invention in an aircraft fuselage panel is advantageous. The sheets according to the invention are also advantageous in aerospace applications such as the manufacture of rockets.

EXAMPLE

In this example, 7 sheets were prepared.

Alloys, the composition of which is given in Table 1, were cast.

TABLE 1

| | Composition (% by weight) | | | | | | |
|---|---|---|---|---|---|---|---|
| | Cu | Li | Mg | Zr | Ag | Fe | Si |
| A | 3.2 | 0.73 | 0.68 | 0.14 | 0.26 | 0.03 | 0.04 |
| B | 3.0 | 0.70 | 0.64 | 0.17 | 0.27 | 0.02 | 0.03 |
| C | 3.0 | 0.73 | 0.35 | 0.15 | 0.27 | 0.02 | 0.03 |
| D | 2.7 | 0.75 | 0.58 | 0.14 | 0.28 | 0.03 | 0.02 |
| E | 2.9 | 0.73 | 0.45 | 0.14 | 0.29 | 0.04 | 0.02 |
| F | 3.2 | 1.01 | 0.32 | 0.14 | 0.32 | 0.05 | 0.03 |
| G | 3.4 | 1.01 | 0.33 | 0.11 | 0.22 | 0.04 | 0.03 |

Target titanium content: 0.03% by weight

The slabs were transformed according to the parameters indicated in Table 2. The transformation conditions used for the alloy sheets A, B, C and F are in accordance with the invention. The working conditions used for alloy sheets D, E and G are reference conditions: for sheets D and E, the reduction in thickness by cold rolling is not in accordance with the invention; for sheet G, the homogenization and heat treatment conditions after cold rolling are not in accordance with the invention. The aging conditions were defined so as to obtain a temper of T8. The rate of temperature rise during the solution heat treatment was in the order of 50° C. per minute.

TABLE 2

| | Sheet working parameters | | | | | | |
|---|---|---|---|---|---|---|---|
| Process | A | B | C | D | E | F | G |
| Homogenization | 12 h 505° C. | 12 h 505° C. | 12 h 505° C. | 12 h 505° C. | 12 h 505° C. | 12 h 505° C. | 12 h 505° C. + 48 h 519° C. |
| Hot rolling output thickness (mm) | 4.37 | 4.39 | 4.38 | 6.28 | 6.28 | 3.2 | 4.5 |
| Final thickness (mm) | 1.52 | 1.52 | 1.52 | 2.53 | 2.53 | 1.6 | 1.6 |
| Reduction of thickness by cold rolling | 2.85 | 2.87 | 2.86 | 3.75 | 3.75 | 1.6 | 2.9 |

TABLE 2-continued

Sheet working parameters

| Process | A | B | C | D | E | F | G |
|---|---|---|---|---|---|---|---|
| (mm) | | | | | | | |
| Heat treatment after cold rolling | 60 min. 425° C. | 60 min. 425° C. | 60 min. 425° C. | 60 min. 425° C. | 60 min. 425° C. | 12 h 380° C. + 3 h 425° C. | — |
| Solution heat treatment | 10 min. 505° C. | 10 min. 505° C. | 10 min. 505° C. | 20 min. 505° C. | 20 min. 505° C. | 10 min. 505° C. | 10 min. 505° C. |
| Stretching | 2% | 2% | 2% | 2% | 2% | 2% | 2% |
| Aging | 36 h 155° C. | 36 h 155° C. | 24 h 155° C. | 40 h 155° C. | 36 h 155° C. | 14 h 155° C. | 14 h 155° |

The granular structure of the test samples was characterized based on microscopic observation of cross sections after anodic oxidation under polarized light. The microstructures observed for test samples A to G are shown in FIGS. 1 to 7, respectively. Shearing bands passing through several grains are not observed on these microstructures. The granular structure of sheets A, B, C and F was essentially unrecrystallized. The granular structure of sheets D, E and G was essentially recrystallized. The texture characterizations were carried out at mid-thickness on sheets A to E. For sheets A, B and C, the P component, the Q component and the sum of the three components Cube, Goss and GC26.5, expressed in volume fraction, are smaller than those of a random crystallographic texture while this is not the case for sheets D and E.

The test samples were mechanically tested to determine their static mechanical properties as well as their resistance to fatigue crack propagation. The yield stress under tension, the ultimate strength and elongation at rupture are given in Table 3.

TABLE 3

Mechanical properties expressed in MPa ($R_{p0.2}$, $R_m$) or in percentage (A %)

| Reference | $R_{p0.2}$ (L) | $R_m$ (L) | A % (L) | $R_{p0.2}$ (TL) | $R_m$ (TL) | A % (TL) | $R_{p0.2}$ (45°) | $R_m$ (45°) | A % (45°) |
|---|---|---|---|---|---|---|---|---|---|
| A | 475 | 522 | 11.7 | 441 | 489 | 14.0 | 380 | 420.0 | 19.6 |
| B | 431 | 486 | 12.9 | 414 | 460 | 17.1 | 358 | 387 | 23.4 |
| C | 423 | 472 | 12.2 | 399 | 451 | 15.9 | 344 | 381 | 19.6 |
| D | 403 | 437 | 11.6 | 371 | 428 | 13.9 | 354 | 403 | 15.7 |
| E | 433 | 464 | 11.4 | 395 | 458 | 11.4 | 394 | 444 | 12.3 |
| F | 466 | 508 | 8.4 | 446 | 490 | 10.7 | | | |
| G | 462 | 501 | 11.3 | 422 | 476 | 15.2 | 428 | 486 | 11.7 |

Figure 8:
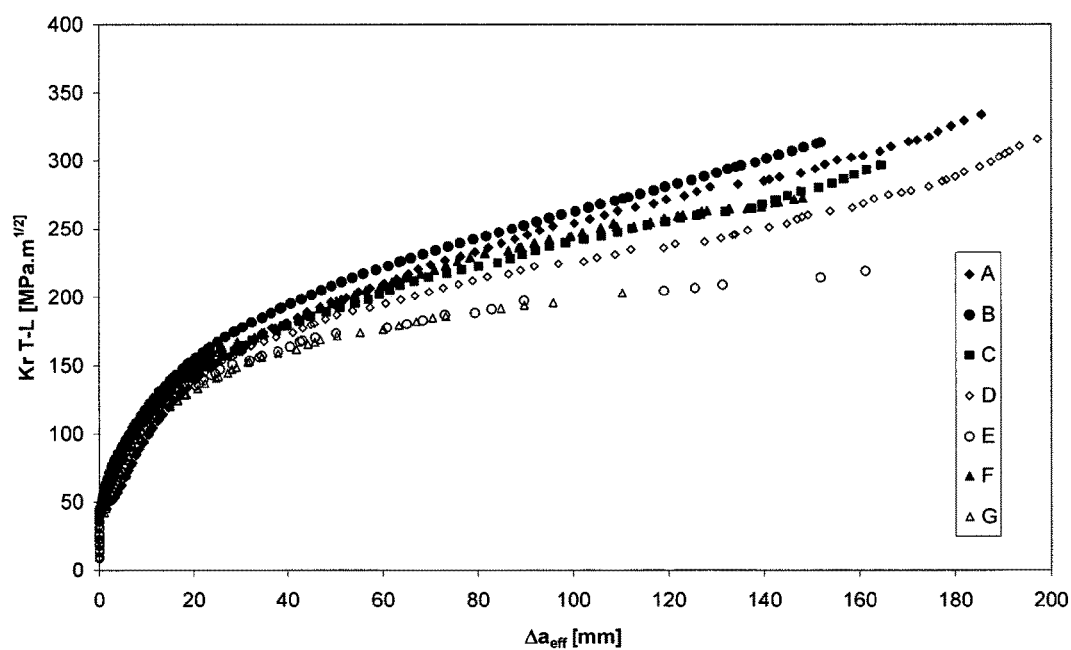
FIG. 8: R-curves obtained in the T-L direction on sheets A to G for test pieces of 760 mm in width.

The R-curves characterized for a test piece width of 760 mm in the T-L direction are provided in FIG. 8.

Table 4 summarizes the fracture toughness test results for these test samples.

TABLE 4 summarizes the results of R-curves for test pieces of width 760 mm.

| | Kapp [MPa√m] | | $\Delta a_{eff}$ max [mm] | |
|---|---|---|---|---|
| Sheet | T-L | L-T | T-L | L-T |
| A | 160 | 114 | 185 | 103 |
| B | 167 | 124 | 152 | 144 |
| C | 154 | 127 | 165 | 110 |
| D | 147 | 151 | 222 | 210 |
| E | 137 | 164 | 161 | 214 |
| F | 157 | 107 | 148 | 114 |
| G | 135 | 145 | 110 | 90 |

Figure 9:
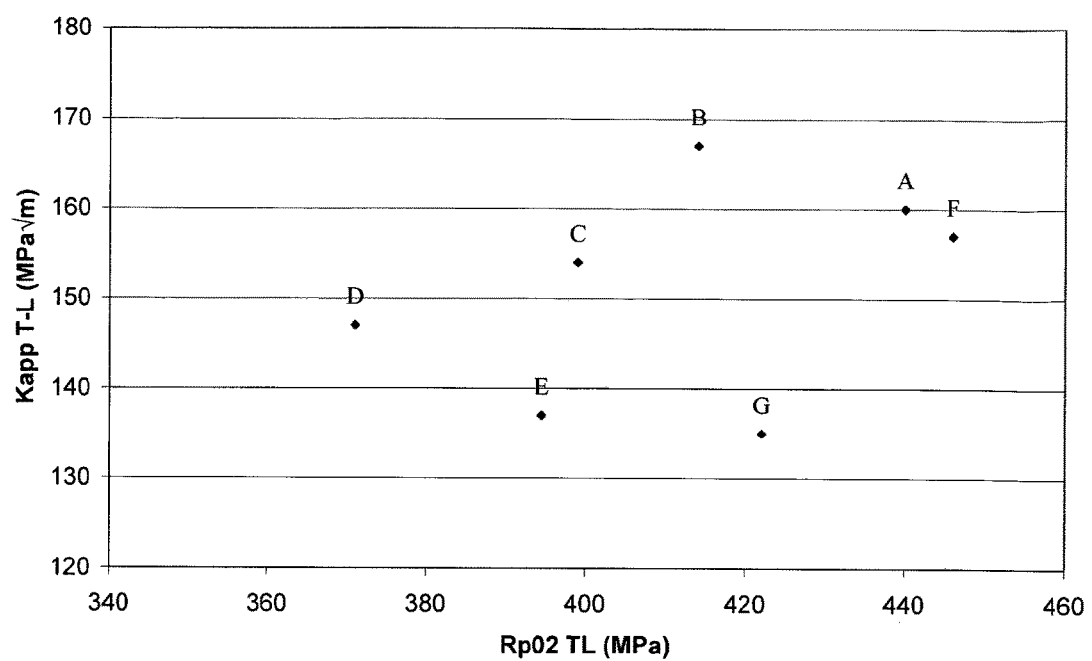
FIG. 9: Relationship between yield stress in the T-L direction and the stress intensity factor Kapp T-L measured on test samples of 760 mm in width for sheets A to G.

FIG. 9 shows the relationship between $K_{app}$ T-L and Rp0.2 LT. It clearly distinguishes the advantage of sheets A, B, C and F according to the invention.

The invention claimed is:

1. A method for producing a sheet of thickness 0.5 to 3.3 mm of essentially unrecrystallized structure made of an aluminum-based alloy said method comprising, successively a) a molten metal bath is prepared comprising
   2.6 to 3.4% by weight of Cu,
   0.5 to 1.1% by weight of Li,
   0.1 to 0.4% by weight of Ag,
   0.2 to 0.8% by weight of Mg,
   0.11 to 0.20% by weight of Zr,
   0.01 to 0.15% by weight of Ti,
   optionally at least one element chosen among Mn, V, Cr, Sc, and Hf, the quantity of element, if chosen, being from 0.01 to 0.8% by weight for Mn, 0.05 to 0.2% by weight for V, 0.05 to 0.3% by weight for Cr, 0.02 to 0.3% by weight for Sc, 0.05 to 0.5% by weight for Hf, a quantity of Zn less than 0.6% by weight, a quantity of Fe and Si less than or equal to 0.1% by weight each, and inevitable impurities with a content less than or equal to 0.05% by weight each and 0.15% by weight in total, b) casting a slab from said molten metal bath
c) homogenizing said slab at a temperature between 450° C. and 515° C.;
d) hot rolling said slab into a plate of thickness between 4 and 12 mm;
e) cold rolling said plate into a sheet of final thickness between 0.5 and 3.3 mm, the reduction in thickness by cold rolling being between 1 and 3.5 mm;
f) performing heat treatment during which the sheet reaches a temperature between 300° C. and 450° C. for at least thirty minutes;
g) solution heat treating said sheet at a temperature between 450° C. and 515° C. and quenching;
h) controlled stretching said sheet with a permanent deformation of 0.5 to 5%, cold working after solution heat treatment being less than 15%;
i) performing aging at a temperature between 130° C. and 170° C. and optionally between 150° C. and 160° C. for 5 to 100 hours and preferably for 10 to 40 hours.

2. The method according to claim 1, wherein the copper content lies between 2.8 and 3.1% by weight and optionally between 2.8 and 3.0% by weight.

3. The method according to claim 1, wherein the lithium content lies between 0.55 and 0.75% by weight and optionally between 0.60 and 0.73% by weight.

4. A sheet of essentially unrecrystallized granular structure, wherein the sheet is obtained by a process comprising the following performed in succession,
   a) preparing a molten metal bath comprising
      2.6 to 3.4% by weight of Cu,
      0.5 to 1.1% by weight of Li,
      0.1 to 0.4% by weight of Ag,
      0.2 to 0.8% by weight of Mg,
      0.11 to 0.20% by weight of Zr,
      0.1 to 0.15% by weight of Ti,
      optionally at least one element chosen among Mn, V, Cr, Sc, and Hf, the quantity of element, if chosen, being from 0.01 to 0.8% by weight for Mn, 0.05 to 0.2% by weight for V, 0.05 to 0.3% by weight for Cr, 0.02 to 0.3% by weight for Sc, 0.05 to 0.5% by weight for Hf,
      a quantity of Zn less than 0.6% by weight, a quantity of Fe and Si less than equal to 0.1by weight each, and inevitable impurities with a content less than or equal to 0.05% by weight each and 0.15% by weight in total,
   e) casting a slab from said molten metal bath
   f) homogenizing said slab at a temperature between 450° C. and 515° C.;
   g) hot rolling said slab into a plate of thickness between 4 and 12 mm;
   e) cold rolling said plate into a sheet of final thickness between 0.5 and 3.3 mm, the reduction in thickness by cold rolling being between 1 and 3.5 mm;
   f) performing heat treatment during which the sheet reaches a temperature between 300° C. and 450° C. for at least thirty minutes;
   g) solution heat treating said sheet at a temperature between 450° C. and 515° C. and quenching;
   h) controlled stretching said sheet with a permanent deformation of 0.5 to 5%, cold working after solution heat treatment being less than 15%;
   i) performing aging at a temperature between 130° C. and 170° C. and optionally between 150° C. and 160° C. for 5 to 100 hours and preferable for 10 to 40 hours, wherein the yield stress $R_{p0.2}$ in the T-L direction is at least 395 MPa, and the fracture toughness in plane strain $K_{app}$, measured on test pieces of type CCT760 (2ao=253 mm) in the T-L direction is at least 150 MPa$\sqrt{m}$.

5. The sheet according to claim 4 wherein the lithium content lies between 0.55 and 0.75% by weight, the elongation of which is at least 14% in the T-L direction.

6. The sheet according to claim 5, wherein the magnesium content lies between 0.40 and 0.65% by weight, whose yield stress $R_{p0.2}$ in the T-L direction is at least 405 MPa, whose fracture toughness in plane strain $K_{app}$, measured on test pieces of type CCT760 (2ao=253 mm) in the T-L direction is at least 160 MPa$\sqrt{m}$.

7. The sheet according to claim 5 wherein the copper content lies between 2.8 and 3.0% by weight, and the elongation of which is at least 15% in the T-L direction.

8. The sheet according to claim 5, wherein the magnesium content lies between 0.40 and 0.65% by weight, the copper content of which lies between 2.8 and 3.0%, the yield stress $R_{p0.2}$ in the T-L direction is at least 410 MPa, whose fracture toughness in plane strain $K_{app}$, measured on test pieces to type CCT760 (2ao=253 mm), in the T-L direction of at least 163 MPa$\sqrt{m}$ and whose elongation in the T-L direction is at least 16%.

9. A sheet according to claim 4 shaped into an aircraft fuselage panel.

10. The sheet according to claim 4, wherein recrystallization rate at half thickness is less than 10%.

11. The sheet according to claim 4, wherein the lithium content is between 0.60 and 0.73% by weight.

12. The sheet according to claim 4, wherein the Ag content is between 0.2 and 0.3% by weight.

13. The sheet according to claim 4, wherein the final thickness is between 1.2 and 2.8 mm.

14. The sheet according to claim 4, wherein the reduction in thickness by cold rolling is between 1 and 3.0 mm.

15. The sheet according to claim 4, wherein cold working after solution heat treatment is less than 10%.

16. The sheet according according to claim 4, wherein the molten metal bath consists essentially of
   a. 2.6 to 3.4% by weight of Cu,
   b. 0.5 to 1.1% by weight of Li,
   c. 0.1 to 0.4% by weight of Ag,
   d. 0.2 to 0.8% by weight of Mg,
   e. 0.11 to 0.20% by weight of Zr,
   f. 0.01 to 0.15% by weight of Ti,
   optionally at least one element chosen among Mn, V, Cr, Sc, and Hf, the quantity of element, if chosen, being from 0.01 to 0.8% by weight for Mn, 0.05 to 0.2% by weight for V, 0.05 to 0.3% by weight for Cr, 0.02 to 0.3% by weight for Sc, 0.05 to 0.5% by weight for Hf,
   a quantity of Zn less than 0.6% by weight, a quantity of Fe and Si less than or equal to 0.1% by weight each, and inevitable impurities with a content less than or equal to 0.05% by weight each and 0.15% by weight in total.

17. The sheet according according to claim 4, wherein the molten metal bath consists of
   a. 2.6 to 3.4% by weight of Cu,
   b. 0.5 to 1.1% by weight of Li,
   c. 0.1 to 0.4% by weight of Ag,
   d. 0.2 to 0.8% by weight of Mg,
   e. 0.11 to 0.20% by weight of Zr,
   f. 0.01 to 0.15% by weight of Ti,
   optionally at least one element chosen among Mn, V, Cr, Sc, and Hf, the quantity of element, if chosen, being from 0.01 to 0.8% by weight for Mn, 0.05 to 0.2% by weight for V, 0.05 to 0.3% by weight for Cr, 0.02 to 0.3% by weight for Sc, 0.05 to 0.5% by weight for Hf, a quantity of Zn less than 0.6% by weight, a quantity of Fe and Si less than or equal to 0.1% by weight each, and inevitable impurities with a content less than or equal to 0.05% by weight each and 0.15% by weight in total.

18. The sheet according to claim 5, wherein the yield stress $R_{p0.2}$ in the T-L direction is at least 410 MPa, and the fracture toughness in plane strain $K_{app}$, measured on test pieces to type CCT760 (2ao =253 mm), in the T-L direction is at least 165 MPa$\sqrt{m}$.

19. The sheet according to claim 17, wherein the lithium content is from 0.55 and 0.75% by weight, the magnesium content is from 0.40 and 0.65% by weight, the copper content is from 2.8 and 3.0% by weight, the Ag content is from 0.2 and 0.3% by weight; and wherein the yield stress $R_{p0.2}$ in the T-L direction is at least 410 MPa, whose fracture toughness in plane strain $K_{app}$, measured on test pieces to type CCT760 (2ao = 253 mm), in the T-L direction of at least 163 MPa$\sqrt{m}$ and whose elongation in the T-L direction is at least 16%.

20. The sheet according to claim 19, wherein the final thickness of the sheet is from 1.2 and 2.8 mm.

\* \* \* \* \*